Feb. 1, 1955 — H. KREIDEL ET AL — 2,701,149

COMPRESSED WEDGE PIPE COUPLING

Filed April 29, 1952

Inventors.
Hans Kreidel, &
Hans Kreidel, Jr.

By
Atty.

United States Patent Office 2,701,149
Patented Feb. 1, 1955

2,701,149

COMPRESSED WEDGE PIPE COUPLING

Hans Kreidel and Hans Kreidel, Jr., Wiesbaden, Germany

Application April 29, 1952, Serial No. 284,898

5 Claims. (Cl. 285—122)

This invention is concerned with a high-pressure pipe coupling comprising a tubular terminal coupling member which forms an annular radially extending seat for receiving, in abutment therewith, the radially extending annular end of a substantially radially non-deformable pipe to be coupled therewith and having an interiorly frusto conical, axially directed tubular extension forming a flaring axially rearwardly directed mouth which surrounds said pipe at the coupling end thereof, and a device for forming with said terminal coupling member around the corresponding end of said pipe a fluid- and pressure-tight joint or seal, said device comprising a plurality of axially serially related tubular sealing elements disposed around said pipe and extending from the interiorly frusto conical, axially directed tubular extension of said terminal coupling member, each sealing element having at the end thereof, which faces said terminal coupling member, an annular cutting and sealing edge which is harder than the material of the pipe, and a plurality of pressure members, one for each of said sealing elements, each for individually applying pressure to its respectively associated sealing element to move it individually axially in the direction of said terminal coupling member for the purpose of deforming it radially inwardly so as to cause the sealing edge of such element to cut and bite into the material of said pipe for the purpose of forming an individual fluid- and pressure-tight seal therewith.

There are pipe couplings known which employ a single tubular sealing element in conjunction with the terminal coupling member and a coacting pressure member of the type mentioned above. Examples of such prior type couplings are disclosed in copending application Ser. No. 232,694, filed June 21, 1951. The invention which is an improvement on the structure of the prior application therefore resides, in one aspect thereof, in the use of a plurality of serially related sealing elements and a pressure member individual to each sealing element, as well as in the particular coaction of each pressure member with its associated sealing element and with the terminal coupling member.

The utility of the prior structures employing a single sealing element with a hardened cutting edge is limited by the shear strength or shear resistance of the material of the pipe to be coupled, as well as by the use of tools by the person making the coupling and by the physical strength of such person. It is on the one hand impossible to apply pressures at the pipe coupling, which exceed the shear resistance of the pipe material at the point where the sealing and cutting edge of the sealing element has entered to form the seal. The tightening of the pressure member which moves the sealing element axially so as to cause its cutting edge to cut and bite into the pipe must, however, be accomplished manually by the use of a suitable tool, wrench or the like. The forces to be overcome by the tightening operation include the deformation of the sealing element, the friction thereof along the interiorly conical wall of the terminal coupling member, as well as along the pipe, and also the pressure-friction resulting from the action of the pressure member. These frictional forces increase with increasing diameter of the pipe to be coupled, and they finally reach values which cannot be overcome by the strength of the person making the joint, no matter what type tool may be used.

The invention overcomes these drawbacks which appear particularly in coupling high pressure pipes having relatively large diameters and requiring coupling members of correspondingly large dimensions.

The forces which are required are, so to speak, subdivided by the provision of a plurality of serially related sealing elements each having its own individual pressure member for applying pressure thereto so as to move and to deform these elements to cause them to bite and cut into the pipe and to form thereby a corresponding plurality of axially serially related annular seals. The plurality of seals produced in this manner increases the cross-sectional area of the effective seal which is subjected to the pressure obtaining in the pipe. Two or more axially serially related sealing elements may be provided if desired. It is accordingly possible to control, by the use of the invention, any desired pressure in the pipe system. A particular advantage resides in the fact that the coupling according to the invention can be made manually by the use of ordinary tools and with a minimum of effort.

The foregoing and additional objects and features of the invention will appear from the detailed description which will presently be rendered with reference to the accompanying drawings. In these drawings, Fig. 1 shows, partly in elevational and partly in sectional view, a pipe coupling according to the invention, the various parts being shown in initial position before tightening the pressure members;

Figure 1:
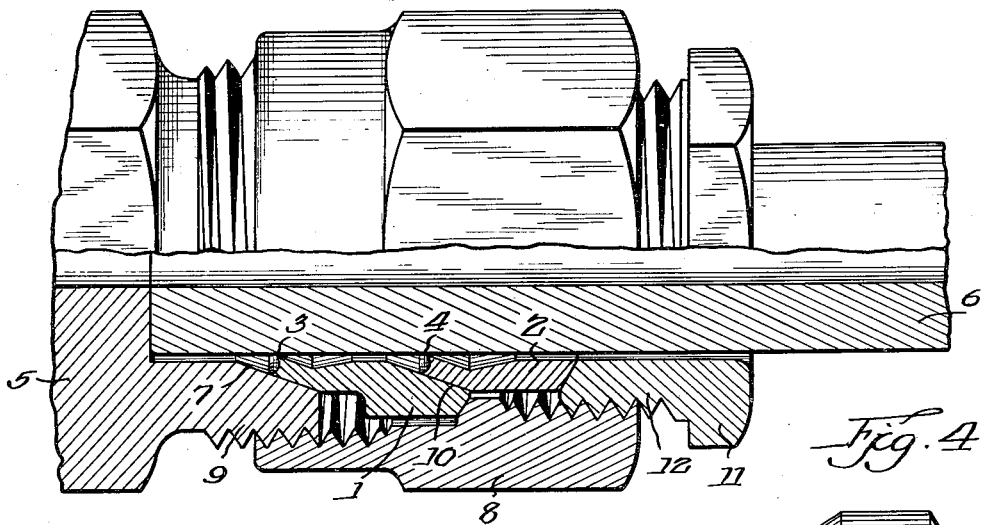
Figure 2:
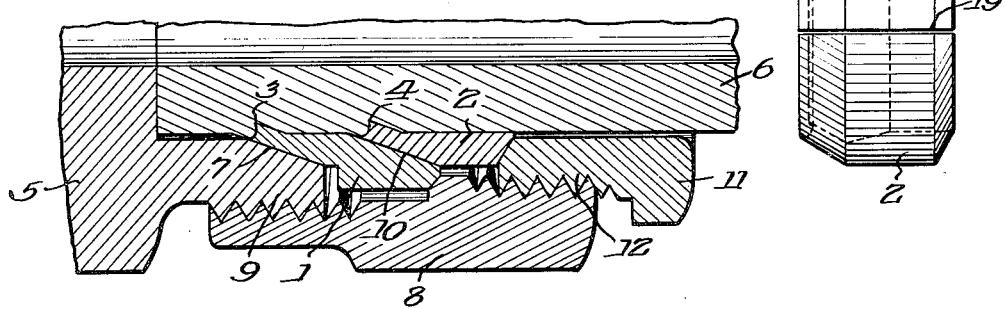
Fig. 2 illustrates, in fractional sectional view, the finished coupling of Fig. 1.

The two sealing elements are indicated in the drawings at 1 and 2. These elements have cutting and sealing edges as indicated at 3 and 4 which are harder than the material of the pipe to be joined with the terminal coupling member 5, the pipe being indicated at 6. The sealing element 1 lies, with its frontal cutting and sealing portion against and within the interiorly frusto conical part 7 of the terminal coupling member 5. In Figs. 1 and 2, pressure is applied to this element 1 by tightening the pressure member 8 which is in threaded engagement with the threaded tubular shank 9. The sealing element 1 is thereby moved axially forwardly in the direction of the terminal coupling member 5 and its axially inwardly or forwardly directed portion forming the frontal cutting edge 3 is thereby driven into the interiorly conical part 7, thus deforming it radially inwardly and causing the cutting edge 3 to cut and bite into the pipe to form in its final position a first annular high-pressure seal as shown in Fig. 2. The rear end of the sealing element 1 is interiorly conical, as indicated at 10, for receiving the frontal cutting portion of the second sealing element 2 which is provided with the hard sealing or cutting edge 4. This second sealing element 2 is axially individually driven into its sealing position in which it forms a second annular high-pressure seal, shown in Fig. 2, by the tightening of the associated pressure member 11 which is in threaded engagement at 12 with the interiorly threaded pressure member 8. The sealing element 2 is tightened to assume its position, as shown in Fig. 2, after completion of the tightening of the first sealing element 1. Its frontal portion carrying the sealing edge 4 coacts thereby with the interiorly frusto conical rear portion 10 of the first sealing element 1 and is accordingly radially inwardly deformed to cause the sealing or cutting edge 4 to cut and bite into the pipe to form the second seal.

The assembling operation is simple and results, with minimum manual effort and without requiring special tools, in a high pressure coupling which provides a sealing area of greatly increased cross-section, in this case of twice the cross-section of the sealing area which could be obtained by the use of a single sealing element.

Figure 3:
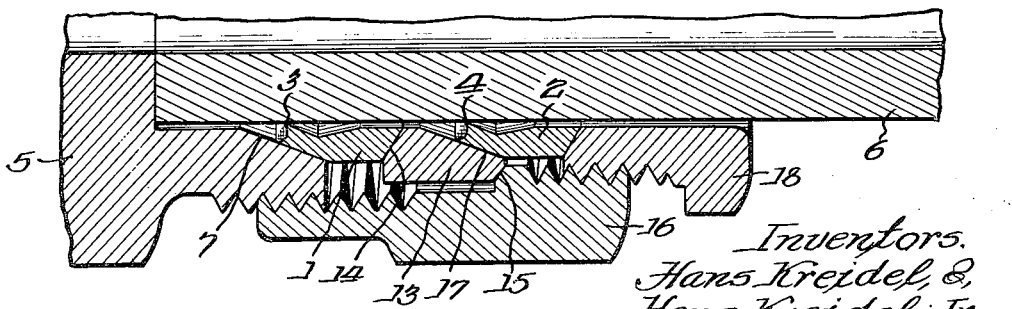
Fig. 3 is a fractional sectional view of a modification showing the various parts in initial position before tightening.

The embodiment shown in Fig. 3 is in its essential parts similar to the structure described with reference to Figs. 1 and 2; and identical parts are indicated by like reference numbers. The difference resides in the use of an intermediate pressure member 13 for driving the first sealing element 1 into its final sealing position, by force applied thereto by the pressure member 16. The rear end of the intermediate pressure member 13 is interiorly frusto conical to receive the frontal portion of the second sealing element 2 which is driven axially inwardly into its sealing position by the tightening of the pressure member 18 relative to the pressure member 16.

Figure 4:
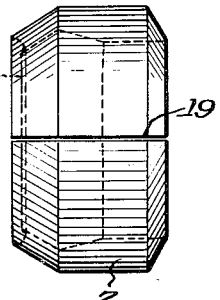
Fig. 4 shows in elevational side view an example of a split tubular sealing member or element.

Either or both tubular sealing elements 1 and 2 (and also further sealing elements that may be provided) may be made in the form of axially split elements to facilitate removal thereof when it is desired to dismount the coupling. An example of such split tubular element is shown in Fig. 4. It is assumed that this element is the one indicated in Figs. 1–3 at 2. It comprises the axially inwardly or forwardly extending portion forming the cutting and biting edge 4 and an axially rearwardly directed portion forming the generally radially directed rearwardly facing shoulder for driving pressure engagement by the associated pressure member such as shown in Figs. 1 and 2 at 11 and in Fig. 3 at 18, respectively. Numeral 19 in Fig. 4 indicates the slot forming the axial split.

The pressure members for the two sealing elements in the examples shown are in threaded connection with each other and with the terminal coupling member. The structure may be modified, of course, e. g., by providing the pressure member such as 11 or 18 with a radial flange and using suitable axially extending tie rods or bolts for securing such flange on a corresponding radial flange of the associated terminal coupling member.

Two serially related sealing elements, as shown, will suffice for most practical uses. It is understood of course that more than two sealing elements may be provided, if desired, and each sealing element may in such a case be associated with its individual pressure or tightening member arranged for cooperation therewith in a manner analogous to that shown in the drawings.

We claim:
1. In a high-pressure pipe coupling having a tubular terminal coupling member forming a radially extending annular seat for receiving in abutment therewith the radially extending annular end of a substantially radially nondeformable pipe to be coupled therewith and having an interiorly frusto-conical axially directed tubular extension forming a flaring axially rearwardly directed mouth which surrounds said pipe at the coupling end thereof; a device for securing said pipe in fluid- and pressure-tight assembly with said terminal coupling member, said device comprising a first tubular sealing element disposed about said pipe and having an axially inwardly directed portion forming at the inner end which faces said flaring mouth of said terminal coupling member an annular sealing and cutting edge which is harder than the material of said pipe, means projecting axially rearwardly from said first sealing element forming a tubular rearwardly flaring extension and forming a rearwardly facing annular generally radially extending shoulder, an annular axially movable first pressure member forming a generally radially inwardly directed annular wall for engagement with said rearwardly facing shoulder of said extension, means for axially moving said first pressure member in the direction of said terminal coupling member for causing said generally radially inwardly annularly directed wall thereof to apply driving pressure to said shoulder for individually moving said first sealing element correspondingly for the purpose of driving the axially inwardly directed portion thereof into said flaring mouth of said terminal coupling member, whereby said axially inwardly directed portion of said first sealing member is radially inwardly deformed to cause said sealing and cutting edge thereof to cut and bite into the material of said pipe so as to effect a first annular high-pressure seal therewith, a second tubular sealing element disposed about said pipe axially rearwardly of said first sealing element, said second sealing element having an internal diameter substantially equal to that of said first sealing element and being of generally similar configuration to said first sealing element and having accordingly an axially inwardly directed portion forming an annular sealing and cutting edge which faces said tubular extension and having an individual extension forming a rearwardly facing annular generally radially directed shoulder of smaller maximum external diameter than said radially extending shoulder of said first means, a second annular axially movable pressure member forming a generally radially inwardly directed annular wall for engagement with said rearwardly facing annular generally radially directed shoulder formed by the extension of said second sealing element, and means for axially moving said second pressure member after effecting said first high-pressure seal by said first sealing element to cause the generally radially inwardly directed annular wall of said second pressure member to apply driving pressure to the rearwardly facing shoulder formed by the extension of said second sealing element for individually moving such second sealing element correspondingly for the purpose of driving the axially inwardly directed portion thereof into the rearwardly flaring extension projecting from said first means, whereby said inwardly directed portion of said second sealing element is radially inwardly deformed to cause the sealing and cutting edge to cut into the material of said pipe so as to effect a second annular high pressure seal therewith.

2. The structure and cooperation of parts as set forth in claim 1, wherein said means projecting axially rearwardly from said first sealing element is integral with such element.

3. The structure and cooperation of parts as set forth in claim 1, wherein said means projecting axially rearwardly from said first sealing element is a separate intermediate annular pressure member with its axially inwardly directed end in engagement with the axially rearwardly directed end of said first sealing element.

4. The structure and cooperation of parts as set forth in claim 1, wherein said first pressure member is in threaded engagement with said terminal coupling member and wherein said second pressure member is in threaded engagement with said first pressure member.

5. The structure defined in claim 1, wherein at least one of said sealing elements is an axially split tubular element.

References Cited in the file of this patent
UNITED STATES PATENTS

| | | |
|---|---|---|
| 2,313,323 | Cowles | Mar. 9, 1943 |
| 2,320,812 | Cowles | June 1, 1943 |
| 2,484,815 | Crawford | Oct. 18, 1949 |

FOREIGN PATENTS

| | | |
|---|---|---|
| 433,656 | England | Aug. 19, 1935 |